Dec. 9, 1941.   H. G. KELLOGG   2,265,842
WINDSHIELD WIPER MOTOR
Filed Aug. 29, 1938   2 Sheets-Sheet 1

INVENTOR
HOMER G. KELLOGG
BY
Whittemore Hulbert & Belknap
ATTORNEYS

Dec. 9, 1941.    H. G. KELLOGG    2,265,842
WINDSHIELD WIPER MOTOR
Filed Aug. 29, 1938    2 Sheets-Sheet 2
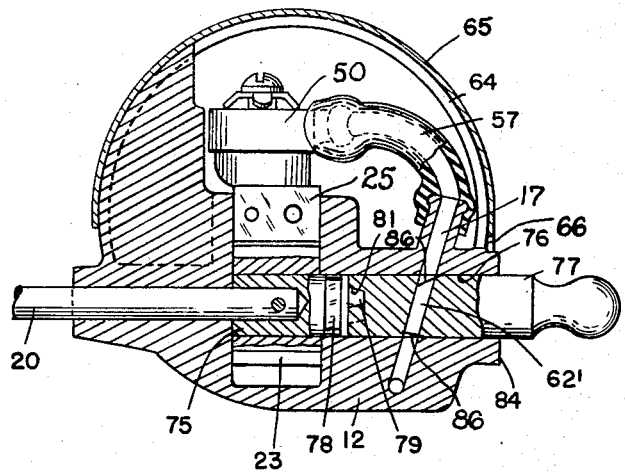
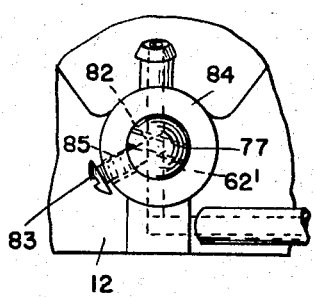
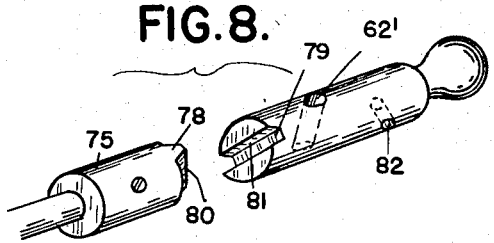
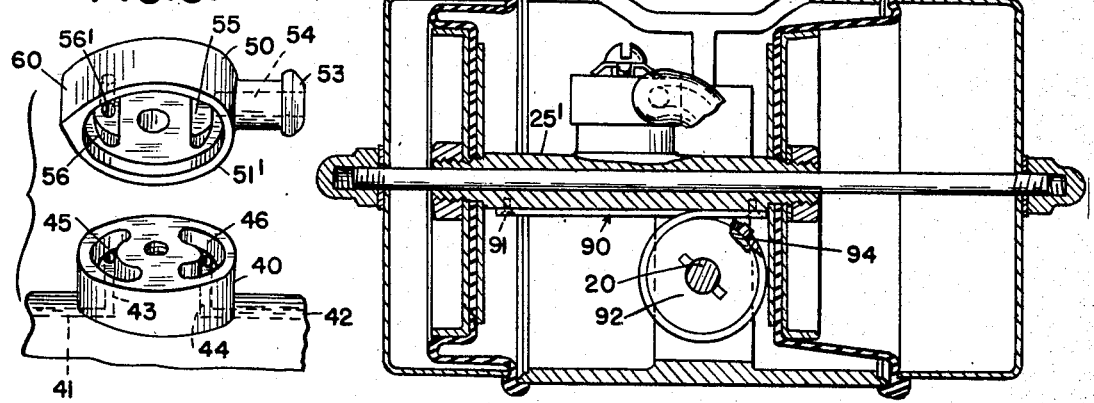
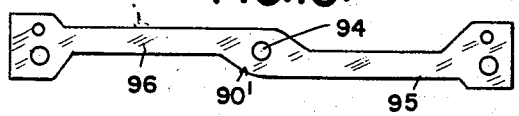
INVENTOR
HOMER G. KELLOGG
BY
Whittemore Hulbert & Belknap
ATTORNEYS Patented Dec. 9, 1941

2,265,842

UNITED STATES PATENT OFFICE 2,265,842

WINDSHIELD WIPER MOTOR

Homer G. Kellogg, Detroit, Mich., assignor to Motor Products Corporation, Detroit, Mich., a corporation of New York Application August 29, 1938, Serial No. 227,412

10 Claims. (Cl. 121—48)

The present invention relates to a windshield cleaner and more particularly to the novel type of pressure actuating windshield cleaner.

Windshield wiper motors of the pressure operated reciprocable type have required rather complex mechanism for actuating the reversing valve.

The present construction is notable for its extreme simplicity and economy of manufacture as well as the structural arrangement which renders it very easily assembled and disassembled. The simplicity of the structure is accomplished without omission of any important function by a complete departure from all structures known to the prior art.

It is an object of the present invention to provide a windshield wiper assembly in which the various major elements are retained in position by a single clamping means.

It is a further object of the invention to provide a windshield wiper assembly characterized by the employment of a cup sealingly associated with the frame so as to provide an expansible and contractable chamber.

It is a further object of the invention to provide a windshield wiper assembly characterized by the use of a cup member to clamp a flexible diaphragm to the frame so as to form an expansible and contractable chamber.

It is a further object of the invention to provide a windshield wiper assembly characterized by the association of two opposed fluid motors which are assembled and retained in position by means of a single supporting member.

It is a further object of the invention to provide a windshield wiper assembly characterized by the association of two opposed motor elements interconnected by a power transmitting element in combination with motor control means carried in part by said element.

It is a further object of the invention to provide a windshield wiper assembly in which an open sided frame is employed, through the open side of which access may be had to the control instrumentalities of the device, in combination with a resilient cover adapted to be snapped in place over the frame to close the open side thereof.

It is a further object of the invention to provide a valve in combination with a flexible conduit adapted to serve as biasing means for the valve and also as a conduit providing for passage of fluid pressure to the valve.

It is a further object of the invention to provide a windshield wiper assembly in which a reversing valve is associated with a reciprocable power transmitting means such that reverse movement of the valve is prevented during reciprocation of the element.

It is a further object of the invention to provide in a windshield wiper construction a manual valve which is adapted both to interrupt operation of the motor means and to retain the wiper on shaft in predetermined position.

It is a further object of the invention to provide in a windshield wiper assembly a manual valve adapted to be moved to a first position to interrupt operation of the motor means and to be moved further in the same direction to mechanically move the wiper arm shaft to a predetermined position.

It is a further object of the invention to provide in a windshield wiper assembly a manual valve adapted to be moved to a first position to decrease the speed of the motor means to prevent further movement of the valve until the wiper arm shaft is in a predetermined position and then to permit further movement of the valve to completely interrupt operation of the motor means and to simultaneously latch the wiper arm shaft in a predetermined position.

Other objects of the invention will be apparent as the description proceeds and when taken in conjunction with the accompanying drawings, and wherein—

Fig. 5 is an exploded perspective showing the valve structure;

Fig. 6 is a section like that of Figure 3 showing a slightly different embodiment of my invention;

Fig. 7 is a fragmentary side elevation of the embodiment shown in Fig. 6;

Fig. 8 is an exploded perspective showing a detail of the embodiment of Figure 6;

Fig. 9 is a longitudinal section illustrating yet another embodiment of my invention;

Fig. 10 is a detail of the tape shown in Figure 9; and

Fig. 11 is an elevation of the drum used in the embodiment shown in Figure 9.

Figure 1:
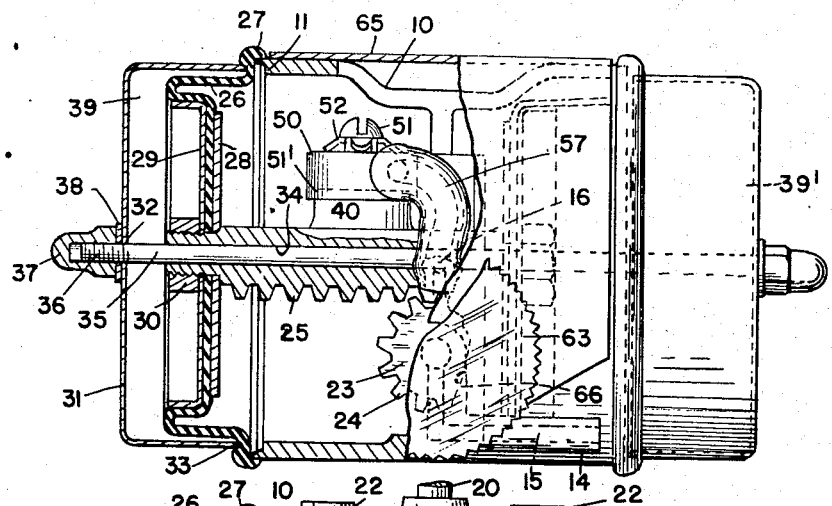
Fig. 1 is a front elevation of my improved construction with parts broken away.
Figure 2:
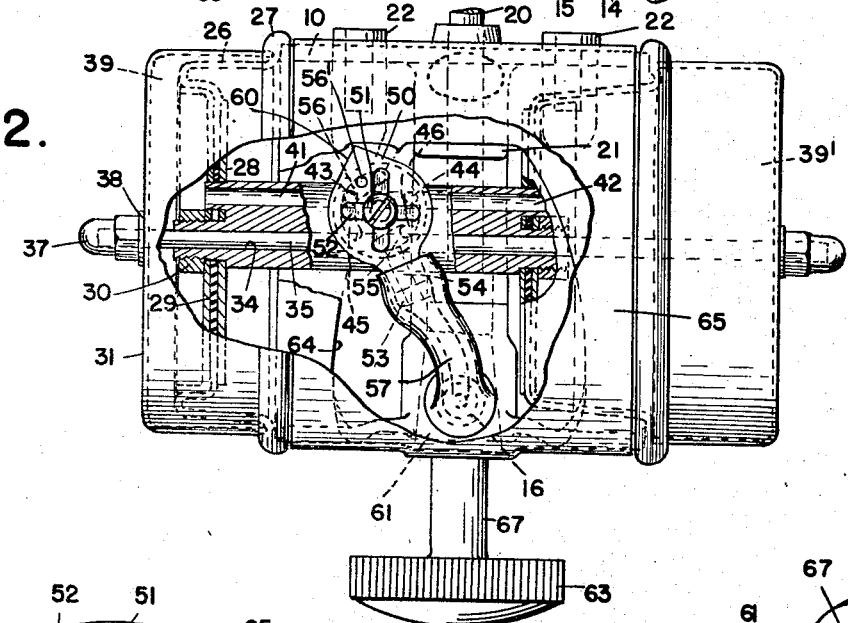
Fig. 2 is a plan view of my improved construction with parts broken away.
Figures 3, 4:
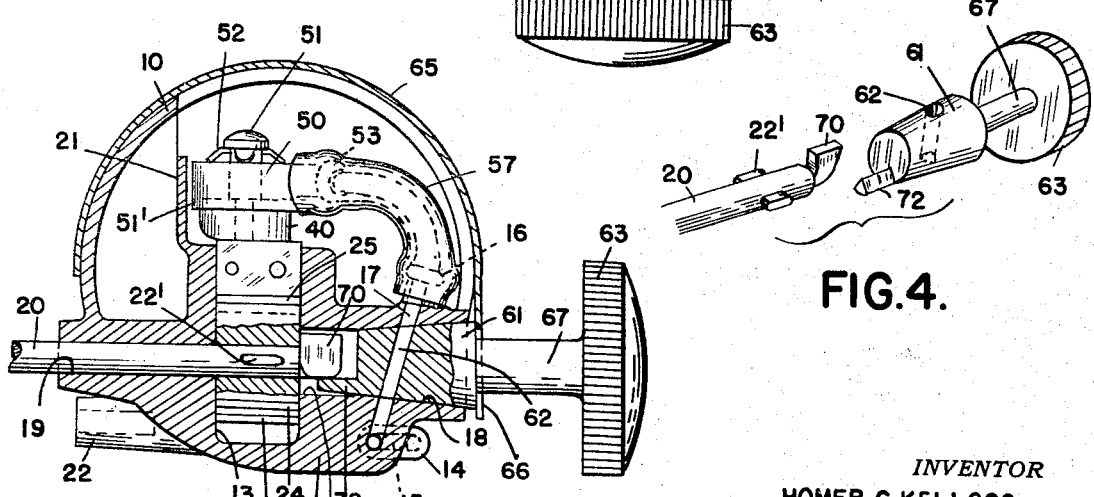
Fig. 3 is a substantially transverse section of my improved windshield wiper assembly.
Fig. 4 is a perspective showing the relationship between the valve and the wiper arm shaft.

The assembly shown in Figs. 1 to 4 comprises essentially a frame member 10 which is open at the top and front thereof, as best seen in Fig. 3, and which is provided with annular end portions 11 defining opposed end openings. The frame 10 is preferably in the form of a casting and is provided with a central block 12 in which is formed a channel 13 for a purpose which will presently appear. The block has a fluid passage 15 formed therein communicating with a nipple 14. A second nipple 16 is formed on the block 12 and the nipple 16 is bored to provide a passage 17 communicating with the passage 15 previously referred to.

The block 12 is also provided with a tapered recess 18 which interrupts the passage 17. The recess 18 is for the reception of a valve member which will subsequently be described.

The block 12 in the frame 10 is further provided with an aperture 19 in which the wiper arm drive shaft 20 is journaled.

Adjacent the upper portion of the channel 13 is provided a flat web 21 which extends for a short distance along the channel 13 and is for a purpose which will later be described.

The block 12 is provided with a pair of bosses 22 which are tapped for the reception of bolts. This construction provides means for mounting the assembly on the motor vehicle and, as will be readily understood, may be supplanted by any other conventional mounting means when rendered desirable by the environment of the assembly.

The wiper arm drive shaft 20 has keyed thereto, as indicated at 22', a pinion 23 which preferably has teeth 24 extending only partially about the periphery thereof. The pinion 23 is adapted to be driven by a meshing rack 25 which is reciprocated by the motor means now to be described.

As previously referred to, the frame 10 terminates at each end in the annular portion 11 which defines oppositely directed openings in the frame. A flexible diaphragm 26 has a peripheral bead 27 formed thereon adapted to fit over the annular portion 11 of the frame. The diaphragm 26 in its central portion is received between the plate 28 and a shallow cup 29, the plate 28 and the cup 29 being held in clamping relation at the end of the rack member 25 as by a nut 30, or the like.

The construction of my improved windshield wiper assembly is identical at both ends, and I will therefore describe in detail the construction of one end only. It will be understood that the construction at the opposite end is identical.

A cup 31 which is centrally apertured as at 32 has an edge 33 which is adapted to clamp the peripheral edge of the diaphragm 26 to the annular portion 11 of the frame, the bead 27 cooperating with the parts just described as best seen in Fig. 1.

The edge or lip 33 of the cup 31, the diaphragm 26 and its bead 27, and the outwardly directed lip of the annular portion 11 of the frame all interfit as shown so that when the nut 37 is tightened, a tight seal results, and the cups are firmly retained on the frame against lateral displacement.

The rack member 25, previously described, is rigidly secured to the diaphragm 26 through the medium of the plate 28 and the cup 29 and is provided with a central aperture 34. Through this aperture 34 a rod 35 is adapted to be slidingly received. The rod 35 also passes through the aperture 32 in the cup member 31 and is provided at its outer ends with threads, indicated at 36, for cooperation with a clamping nut 37. A suitable sealing gasket 38 is provided.

From the foregoing description it will be seen that the cup 31 and the flexible diaphragm 26 form an expansible and contractable chamber 39. I have found that the most efficient results are obtained by employing a flexible diaphragm, such as shown in 26, but it will be understood that if desired a piston member reciprocable within the cup 31 and secured to the rack member 25 may be substituted.

The rack member 25 is provided near its mid portion with an upstanding boss 40, as best seen in Fig. 5, which serves as a valve seat. The rack member 25 is further provided with a passage 41 (see Fig. 2), which communicates with the interior of the chamber 39. A corresponding passage 42 is adapted to communicate with the chamber 39' corresponding to chamber 39 at the opposite end of my assembly. Passages 41 and 42 communicate with the passages 43 and 44 which open adjacent each other in the top surface of the boss 40. Passage 43 opens into a lunar shaped recess 45 and the passage 44 opens into a corresponding lunar shape recess 46.

A valve 50 is rotatably supported on the valve seat formed by the boss 40 by means of a bolt 51 and a depending flange 51' adapted to surround a portion of the boss 40 and is urged against the valve seat resiliently as by the spring 52. The valve 50 is further provided with a nipple 53 which has a passage 54 formed therein which communicates with recess 55. A short length of resilient tubing 57, preferably of pure gum rubber, interconnects nipples 53 and 16. The valve 50 is further provided with a recess 56 communicating with an aperture 56' which opens in the upper face of the valve member.

The valve 50 is adapted to be shifted between two limiting positions, one of which is that indicated in Fig. 2 is which the recess 55 communicates through the recess 46 which the passages 44 and 42 so that the right-hand chmber 39' is connected to the source of fluid presure. At the same time the aperture 56 in the valve 50 communicates through the recess 45 with passages 43 and 41 and therefore the left-hand chamber 39 is opened to atmosphere.

The present motor is primarily intended to be connected to a source of reduced pressure in a motor vehicle, such as for example, the manifold. However, the motor described operates equally well at a pressure above atmospheric and, therefore, I have referred generically to sources of pressure, intending to be comprehended within this term, both a source of reduced pressure and a source of super-atmospheric pressure.

The valve 50, as best seen in Fig. 2, is provided with a projection or cam surface 60 formed thereon. The projection 21 of the frame previously referred to is adapted to cooperate with the projection 60 to assist in controlling movements of the valve 50.

It will be understood the valve 50 being carried by the reciprocable power transmitting member 25 moves therewith relative to the upwardly projecting flat plate 21. In the position shown in Fig. 2, the resilient tube 57, due to its own resiliency, has rotated the valve 50 to the position shown.

In this position the source of reduced fluid pressure, which as previously described may be the manifold of the vehicle, is connected through the flexible tube 57, the recess 55, the recess 46 and passages 44 and 42 to the chamber 39' at the right-hand end of the mechanism. At the same time the chamber 39 at the left of Fig. 2 communicates through passages 41 and 43, recess 45, recess 56 and the passage 56' to atmosphere. Under these circumstances atmospheric pressure acting on the diaphragm 26 at the left of Fig. 2 exerts a greater force thereon than does the reduced pressure in chamber 39' at the right in Fig. 2. Under these conditions, the power transmitting element 25 moves to the right carrying the valve 50 therewith. During the initial movement, the valve is maintained at substantially the position shown in Fig. 2. However, as this movement of the power transmitting member continues so that the nipple 53 is carried to the right of nipple 16 the resilient tube 57 tends to turn the valve in a clockwise direction.

The projection 60 formed on the valve 50 engages the surface of the projection 21 almost immediately upon initiation of its movement to the right in Fig. 2. Throughout its movement the projection 60 bears against the projection 21 and is thereby prevented from rotating in a clockwise direction. The projection 21 is proportioned so that just prior to completion of the movement of the power transmitting member 25 and associated parts to the right in Fig. 2, the projection 60 of the valve slips off the right-hand edge of the member 21. At this time a substantial force has been built up, due to distortion of the resilient tube 57, with the result that as soon as the projection 60 is released from the plate 21 the valve 50 snaps clockwise to a predetermined position.

As formed, the valve passages both in the valve seat formed at the top of boss 40 and in the valve member 50, terminate at their engaging surface in lunar shaped recesses, as previously described. Due to this, it is unnecessary that the valve be moved to a predetermined position, since when the valve is moved to approximate position the lunar shaped recesses will overlap substantially and provide a substantially unrestricted passage. It is therefore unnecessary to provide exactly predetermined stop means for the valve with the result that the motor will operate more quietly. In motors of this type, where a valve member is snapped between predetermined positions and is brought to rest by engaging stop means, there is unavoidably caused a certain amount of undesirable noise.

As best seen in Fig. 3, a manual valve 61, which is tapered to fit snugly within the conical recess 18 is provided. Valve member 61 has a passage 62 formed therein, the passage 62 being adapted when the valve is rotated to proper position to connect the portions of passage 17 above and below the conical recess 18. A button 63 is provided, the edges of which are knurled to facilitate manual manipulation.

One of the important features of the construction of my improved windshield wiper assembly is that the frame has an opening 64 at its side above the valve 61. This opening 64 provides for access to the interior of the casing for inspection and adjustment. In order to close the opening 64 when the device is to be used, a resilient cover plate 65 is provided. This cover plate is preferably made of thin sheet metal and is formed as best seen in Fig. 3 so as to embrace slightly more than 180° of the generally cylindrical frame. Due to this construction, the cover plate may be placed in position simply by pressing the same downwardly upon the frame, as seen in Fig. 3. When in position, it will be retained tightly thereon, due to its own inherent resiliency.

I take advantage of the resiliency of my cover plate to perform another important function in my assembly. As best seen in Fig. 3, the cover plate at its forward edge is provided with a slot 66 which is adapted to pass over the stem 67 of the valve 61. At the same time, the slot 66 is of less width than the large end of the valve plug 61. With the parts assembled as shown in Fig. 3, as will be readily apparent, the cover plate around the slot 66 bears against the valve plug 61 and tends to retain the same tightly in its seat 18. In order to remove the valve 61, it is only necessary to lift the cover plate 65 upwardly after which the valve may be withdrawn directly.

The manual valve 61 performs another important function, as will now be described. The wiper arm drive shaft 20 at its inner end has a lateral projection 70 formed thereon for which a recess 71 is provided, communicating with the tapered valve seat 18. The valve plug 61 has formed thereon an eccentric key or projection 72 which is adapted to cooperate with the lateral projection 70. With the parts as shown in Fig. 3, it will be noted that the projection 72 is in lowermost position, whereas projection 70 is in uppermost position.

As is conventional in windshield wipers, the wiper arm drive shaft 20 is adapted to oscillate through an angle less than 180°. In other words, in normal operation the projection 70 will oscillate in either direction from the upright position shown in Fig. 3 to positions somewhat less than 90° to either side thereof. These two limiting positions will be the positions of the projecting 70, which corresponds to the extreme positions of the wiper arm carried by the shaft 20, as will readily be understood.

With the wiper arm in normal operation, if the button 63 is turned so that the passage 62 no longer interconnects the separated portions of the passage 17, the motors will stop. The position in which the motors stop is not predetermined and will correspond to their instantaneous position when the manual valve is operated.

It is highly desirable that the windshield wiper blade upon interruption of its operation be moved to and retained in an inoperative position, preferably in a limiting position so that the wiper blade will not interfere with the vision of the operator of the vehicle. In my improved construction this is provided for in a very simple manner by the projections 70 and 72, previously referred to.

The first rotation of the manual valve 61 interrupts operation of the motors and a further turning of the button 63 brings the projection 72 into engagement with the projection 70 irrespective of the position at which the wiper arm is stopped. Continued rotation of the button 63 through the inter-engagement of the projections 70 and 72 results in a manual rotation of the drive shaft 20 until it reaches limiting position. It will be appreciated that this may be accomplished by rotating the button 63 in either direction so that the wiper arm may be parked in either limiting position as desired.

In the event that the wiper blade is moved, as often happens when the attendant at a gasoline station wipes the windshield, this results merely in the turning of the button 63 and it is then only necessary for the operator of the vehicle to return the wiper blade to parked position by rotation of the button 52.

A second embodiment of my invention is illustrated in Figs. 6 to 8, inclusive, in which a somewhat different arrangement is provided for moving the wiper arm to parked position. This embodiment involves somewhat different principles and in several respects is superior to that previously described.

With the exception of the manual valve and the drive shaft for the wiper arm, the parts are the same as previously described and the description will not be repeated. As best seen in Fig. 6, the wiper arm drive shaft 20 carries a pinion 23 meshing with rack 25. The pinion 23 is secured to the shaft 20 through the medium of a member 75 which is keyed or otherwise secured to the shaft 20 and is interlocked by suitable means to the pinion 23. It will be appreciated that if desired the pinion 23 and member 75 may be combined as a single integral member.

The block 12 of the frame in this modification is provided with a cylindrical bore 76 for the reception of a cylindrical push-pull type valve 77. The valve 77 is provided with a passage 62' which serves to interconnect the portions of the passage 17 separated by the bore 76. In the position shown in Fig. 6, the valve is in open position and pressure is being supplied through the flexible tube 57 to the valve 50.

The member 75 is provided with a projection 78, best seen in Fig. 8. A recess 79 which corresponds in shape with the projection 78 is formed in the end of the valve 77. Projection 78 has tapered sides 80, and the sides 81 of the slot 79 are correspondingly tapered for a purpose which will presently appear.

In addition to the passage 62', the valve 77 is provided with a tapped hole 82 for the reception of a bolt 83, as seen in Fig. 8. The bore 76 is surrounded adjacent its end with a bushing indicated in Fig. 7 by the numeral 84. This bushing is provided with a longitudinal slot 85 for the reception of the bolt 83. As will be readily understood, the slot 85 cooperates with the bolt 83, prevents rotation of the valve 77 and also limits its movements. If desired, the slot 85 may be open at one end of the bushing so that removal of the bolt is not necessary in order to remove the valve.

The valve 77 is adapted to be reciprocated to control the supply of fluid pressure to the motors and also to locate the wiper arm in parked position. This is accomplished as follows: With the parts in the position indicated in Fig. 6, the valve 77 may be pushed inwardly substantially interrupting communication between passage 62' and 17. In order that this interruption will not be complete, the valve is provided with short tapered portions 86 communicating with the passage 62'. Since with the parts in the position as shown in Fig. 6, the projection 78 is not in alignment with the slot 79, the parts will engage before the passage 17 is closed. The partial closure of this passage, however, will reduce the rate of operation of the motors with the result that the windshield wiper will approach parked position relatively slowly. As soon as the projection 78 becomes aligned with the recess 79 the valve may be pushed further inwardly simultaneously completely interrupting the flow of fluid through passage 17 and blocking the wiper arm drive shaft 20 in parked position.

Due to the inclined sides 80 of the projection 78 and the correspondingly inclined sides 81 of the slot 79, forcible displacement of the wiper arm drive shaft, as for example in cleaning the windshield, will cause the valve 77 to be moved slightly outwardly without damage to the parts. It will be understood that the resilient cover 65 in this modification does not engage the valve 77, the slot 66 therein being substantially larger than the diameter of the valve 77.

By means of this construction a windshield wiper in which the blade may be mechanically parked in predetermined position is provided in an extremely simple manner. The number of parts is reduced to a minimum and the parts as designed may be produced economically.

A modification of the means for transmitting power from the motors to the drive shaft is illustrated in Figs. 9 to 11. In these figures a mechanism is illustrated in which a tape and drum drive is substituted for the rack and pinion drive previously described. Fig. 9 shows the essential parts of the mechanism. Since this figure differs only in the power transmitting means it will not be described in detail. The power transmitting member 25' which corresponds to the rack 25, shown in Fig. 1, is not provided with rack teeth, but instead has secured adjacent its ends a tape 90, shown in detail in Fig. 10. The tape 90 is bolted as indicated at 91 to the power transmitting member 25' and at its central portion is wrapped about a drum 92 shown in detail in Fig. 11. The drum 92 is keyed or otherwise secured to the shaft 20 and is adapted to be rotated by the tape 90. For this purpose a lug or projection 93 is formed on the drum which is adapted to be received within an aperture 94 formed centrally in the tape 90. In order to prevent interference between the two ends of the tape, they are laterally offset, as indicated in Fig. 10, to provide portions 95 and 96, which when wrapped about the drum 92 will be laterally or axially spaced from each other. In this modification the parts not described in detail are identical to those previously described. It will be understood that either the push-pull type valve or the rotary type valve may be employed.

The foregoing detailed description has been given for clearness and understanding only, and no unnecessary limitation should be understood therefrom.

What I claim as my invention is:

1. In a windshield cleaner, a frame terminating in an annular portion defining an opening, said frame having a way formed therein for a part reciprocable toward and away from said opening, a diaphragm peripherally engageable with said annular portion, a cup having an edge adapted to interfit against lateral displacement with said annular portion and diaphragm, and to clamp the diaphragm therebetween, a rod extending through said frame, means securing said rod against longitudinal movement in said frame, a part reciprocable in said way, slidable on said rod, and secured centrally to said diaphragm, said rod being secured to said cup and serving as the sole means to retain all of said parts in assembled position and to retain said cup in sealed relation to said diaphragm.

2. In a windshield wiper motor, a frame having openings at opposite ends, a diaphragm at each end of said frame covering said openings, an inwardly open cup at each end of said frame, said frame openings and said cups having edge portions adapted to interfit so as to prevent lateral displacement of said cups relative to said openings, a diaphragm over each opening having a peripheral portion sealingly clamped between said edge portions, a single rod extending between said cups, means on said rod engaging said cups and serving as the sole means for clamping said cups over said peripheral portions of diaphragms and against the frame.

3. A windshield wiper motor comprising a frame having oppositely directed openings and having an open-sided guideway intermediate and aligned with said openings, an elongated drive element in said guideway, said element and said way being formed to permit longitudinal movement of said element in said way and to prevent turning of said element in said way, flexible diaphragms over the open ends of said frame, inwardly open cups over said diaphragms and sealingly engaging the peripheries of said diaphragms between the edges of said cups and the edges of said openings, said drive element having its opposite ends secured to said diaphragms, a longitudinal opening extending through said element, a rod extending through said longitudinal opening to retain said element in said open-sided guideway, and secured at its ends to said cups.

4. A windshield wiper motor comprising a frame having an open-sided guideway formed therein, a reciprocable drive member in said guideway, a driven shaft mounted in said frame and operably connected to said drive member, a pair of cups seated against said frame in alignment with said guideway, pressure-actuated elements in said cups connected to opposite ends of said drive member, said drive member having a longitudinally extending opening therethrough, and a rod extending through said opening, secured at opposite ends to said cups, and adapted to retain said drive member in said open-sided guideway.

5. In a windshield wiper motor, a frame having a relatively deep recess therein, and an open-sided guideway communicating with said recess, a pinion in said recess, a rack slidable longitudinally in said guideway and meshing with said rack, cups seated at opposite ends of said frame in alignment with said rack and defining portions of expansible and contractable chambers, pressure-actuated elements in said chambers connected to opposite ends of said rack, said rack having a longitudinally extending opening, a rod extending through said opening to retain said rack in said guideway, and clamping means at the ends of said rod engaging said cups to retain said cups seated on said frame.

6. A windshield wiper motor comprising a frame having openings at opposite ends defined by outwardly extending lips, flexible diaphragms closing said openings and having thickened peripheral beads located outside said lips, inwardly open cups over said diaphragms having lips engaging inside said beads, said cups and diaphragms forming closed, expansible and contractable pressure chambers, a drive element interconnecting said diaphragms, a longitudinal opening, a rod extending through said longitudinal opening, and clamping means at the ends of said rod engaging said cups and clamping said cups in sealing relation against said diaphragms.

7. A windshield wiper motor having a frame, operating means on said frame, a removable, manually operable control valve extending from said frame, a resilient cover adapted to snap over said frame to conceal said operating means, said cover having a slot portion adapted to engage an intermediate portion of said removable valve to retain the same resiliently in its seat, while exposing a portion of said valve for manual operation with said cover in place.

8. A windshield wiper motor comprising a frame having a recess therein, a removable, manually operable control valve rotatably mounted in said recess and having an operating portion extending from said recess, operating mechanism on said frame, a resilient cover adapted to snap over said frame to conceal said operating mechanism, said cover having a slot portion adapted to engage an intermediate portion of said control valve to retain the same resiliently on its seat while exposing the manual operating portion thereof.

9. A windshield wiper motor comprising a frame having openings at opposite ends surrounded by outwardly extending lip portions and having a longitudinally extending, open-sided guideway in alignment with said openings; peripherally beaded, flexible diaphragms over said openings, with the beads thereof located outside said lip portions; inwardly open cups having inwardly extending lip portions adapted to seat inside the beads of said diaphragms, and to interfit therewith and with the lip portions of the frame so as to prevent lateral displacement of said cups on said frame; a drive element slidable longitudinally in said open-sided slot and secured at its ends to said flexible diaphragms, said drive element having a longitudinal opening therethrough; a rod extending through said longitudinal opening and engaging said cups, whereby said rod secures said cups in sealed relation with said diaphragms and in aligned relation with said guideway, said cups thereby locating said rod against lateral movement on said frame, and said rod thereby retaining said drive element in said open-sided guideway.

10. A fluid motor comprising a frame having oppositely directed openings; inwardly open cups fitting against lateral displacement over said openings; centrally apertured pressure actuated elements in said cups; an intermediate power transmitting member interconnecting said elements, said member having an aperture registering with the apertures in said elements; and a rod passing through the openings in said frame and the apertures in said member and said elements, and engaging said cups to retain said motor in assembled position.

HOMER G. KELLOGG.